United States Patent [19]

Itoh et al.

[11] Patent Number: 5,005,938
[45] Date of Patent: Apr. 9, 1991

[54] OPTICAL WAVELENGTH CONVERTICAL APPARATUS

[75] Inventors: Tatsuo Itoh, Osaka; Shinichi Mizuguchi, Katano; Keishi Kubo, Moriguchi; Takeo Sato, Kawasaki, all of Japan

[73] Assignee: Matsushita Electric Industry Co., Ltd., Osaka, Japan

[21] Appl. No.: 347,817

[22] Filed: May 4, 1989

[30] Foreign Application Priority Data

May 6, 1988 [JP] Japan .................. 63-111090
Jul. 15, 1988 [JP] Japan .................. 63-177813
Jul. 15, 1988 [JP] Japan .................. 63-177814

[51] Int. Cl.$^5$ .................... G02B 6/32
[52] U.S. Cl. ......................... 350/96.18
[58] Field of Search .......... 350/96.18, 432, 96.30

[56] References Cited

U.S. PATENT DOCUMENTS 4,151,752  5/1979  Perdijon .................. 350/432

Primary Examiner—William L. Sikes
Assistant Examiner—Robert E. Wise
Attorney, Agent, or Firm—Wenderoth, Lind & Ponack

[57] ABSTRACT

An optical wavelength converting apparatus for converting the divergent lights by a compact apparatus into a parallel lights comprises a light source, a means for collecting the lights from the light source to introduce them into the optical waveguide of the wavelength converting element, a rotation symmetrical lens disposed on the end portion opposite to the end portion on the side irradiated with the collected lights, thereby to make it possible to convert the divergent lights like Cherenkov radiation lights into parallel lights by a compact apparatus.

10 Claims, 5 Drawing Sheets

OPTICAL WAVELENGTH CONVERTICAL APPARATUS

BACKGROUND OF THE INVENTION

The present invention generally relates to a light wavelength converting apparatus for converting divergent rays into parallel rays.

Conventionally, it is known to generate a second higher harmonic for converting the wavelength of laser light in half through the application of the nonlinear optical effect as disclosed in Japanese Laid-Open Patent Application Tokkaisho No. 61-72222, etc.

An apparatus for converting the wavelength of laser light in half will be described hereinafter with reference to FIG. 9 through FIG. 11.

Referring to FIG. 9, a light wavelength converting element 3 is composed of a nonlinear optical crystalline substrate 1 and an optical waveguide 2 disposed on the nonlinear optical crystalline substrate 1, with reference numerals 4, 5, 6, 7 designating a light incidence portion of the optical wavelength converting element 3, a semiconductor laser, a collimator lens, and a focusing lens.

When the rays 8 converged by the collimator lens 6 and the focusing lens 7 are introduced into the light incidence portion 4, the second higher harmonic (hereinafter referred to as SH rays) is produced by the nonlinear optical effect provided by the optical waveguide 2. It is to be noted that the primary rays 18 pass through the optical waveguide 2.

The SH rays 9 are known as Cherenkov radiation light which is transmitted in the form of semi-circular divergent rays 10 as shown in FIG. 11. The SH rays 9 are transmitted at an angle A in the y direction relation to the waveguide 2 and at an angle B in the x direction.

However, because the SH rays 9 which are divergent as described hereinabove are hard to use, luminous flux means for transmitting the divergent rays 10 as parallel rays is required.

A conventional optical wavelength converting apparatus will be described hereinafter with reference to FIG. 12.

The SH rays 9 radiating from an SHG element (not shown) are collimated in the x-direction by the cylindrical convex lens 12. Then, they are diverged by the cylindrical concave lens 13 and become rays of light 16 divergent in the y-direction. Then, the expanse thereof in the y-direction is collimated by the cylindrical convex lens 14 into parallel rays 17. However, the above-described structure requires three cylindrical lenses, thus resulting in a large apparatus. Furthermore, the above-described structure is effective when used with a spot light source. Completely parallel rays could not be provided when used with a linear light source which has a waveguide passage length that transmits Cherenkov radiation light.

SUMMARY OF THE INVENTION

Accordingly, an essential object of the present invention is to provide an improved compact optical wavelength converting apparatus for transmitting Cherenkov radiation light as parallel rays.

In accomplishing the object, the optical wavelength converting apparatus of the present invention is provided with a light source, means for transmitting the light radiating from the light source into the optical waveguide passage of the wavelength converting element, and a rotary object lens which is disposed on the end of the wavelength converting element opposite to that onto which the rays of light are incident.

More specifically, a conical lens or one portion of a conical lens is used as the rotary object lens, with the rotary object optical axis being aligned with the central axis of the optical waveguide passage.

This structure realizes a compact apparatus which transmits such diffused rays as Cherenkov radiation rays of light as parallel rays.

BRIEF DESCRIPTION OF THE DRAWINGS

Other objects and features of the present invention will become apparent from the following description taken in conjunction with the preferred embodiment thereof with reference to the accompanying drawings, in which.

DETAILED DESCRIPTION OF THE INVENTION

Figure 1:
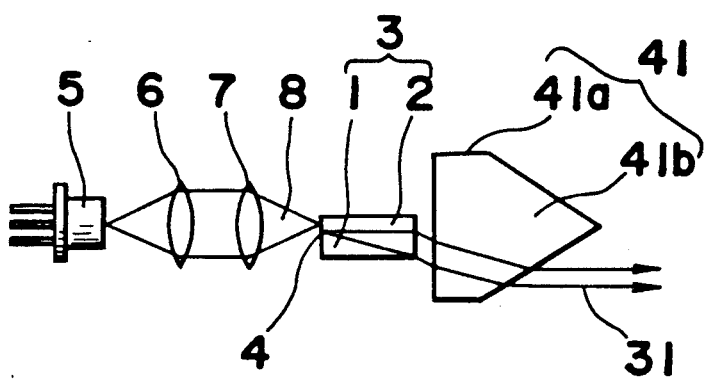
FIG. 1 is a schematic of an optical wavelength converting apparatus according to a first embodiment of the present invention.

Before the description of the present invention proceeds, it is to be noted that like parts are designated by like reference numerals throughout the accompanying drawings.

FIG. 1 is a schematic of an optical wavelength converting apparatus according to one embodiment of the present invention.

Figure 9:
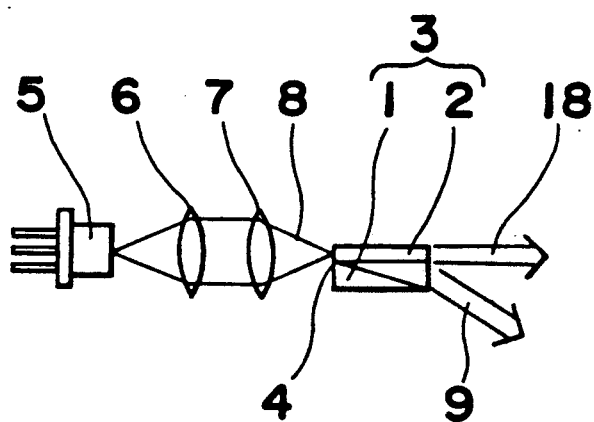
FIG. 9 is a schematic of a conventional optical wavelength converting apparatus.
Figure 10:
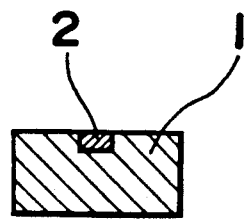
FIG. 10 is a sectional view of a conventional optical wavelength converting element used in the apparatus of FIG. 9.
Figure 11:
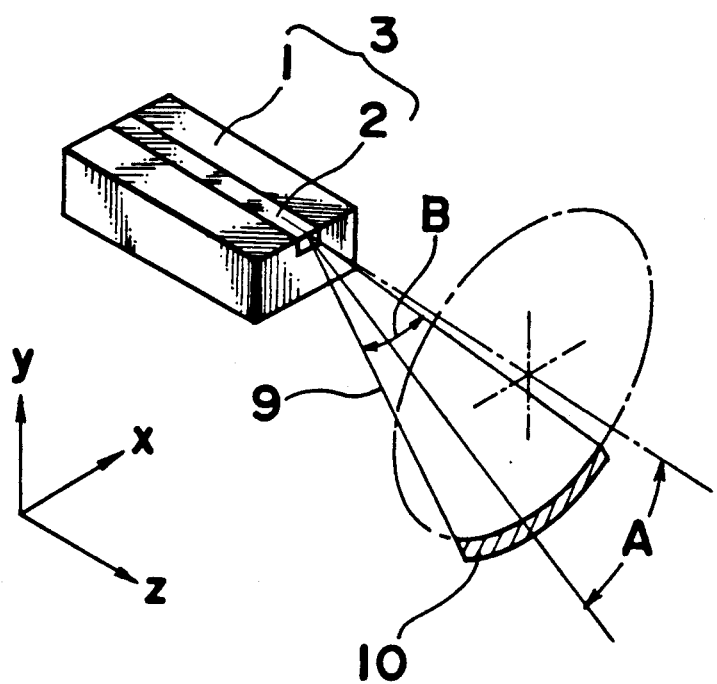
FIG. 11 is a perspective view showing diffused rays transmitted from the optical wavelength converting element in the prior art apparatus.
Figure 12:
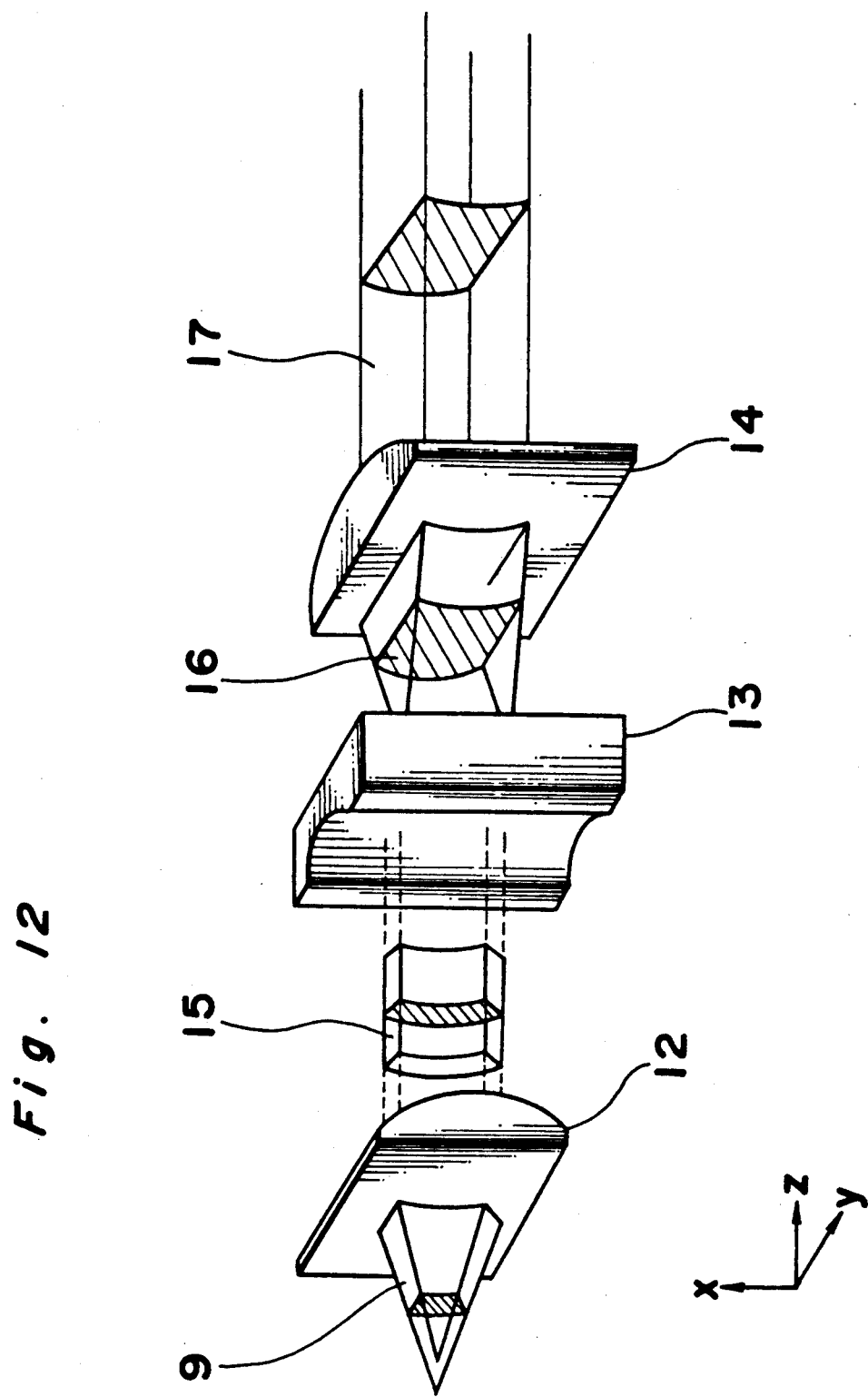
FIG. 12 is a perspective view of a conventional apparatus for obtaining parallel rays.

Referring to the same drawing, the present invention is different from the prior art of FIG. 9 in that a rotary object lens 41 having a cylindrical portion 41a and a conical portion 41b is used to transmit the light coming from the optical wavelength converting element 3 as parallel rays.

According to the present invention, the Cherenkov radiation light to be radiated from the light wavelength converting element 3 may be transmitted as parallel rays by the rotary object lens 41.

The operating principle thereof will be described hereinafter with reference to FIG. 2 and FIG. 3.

Figure 2:
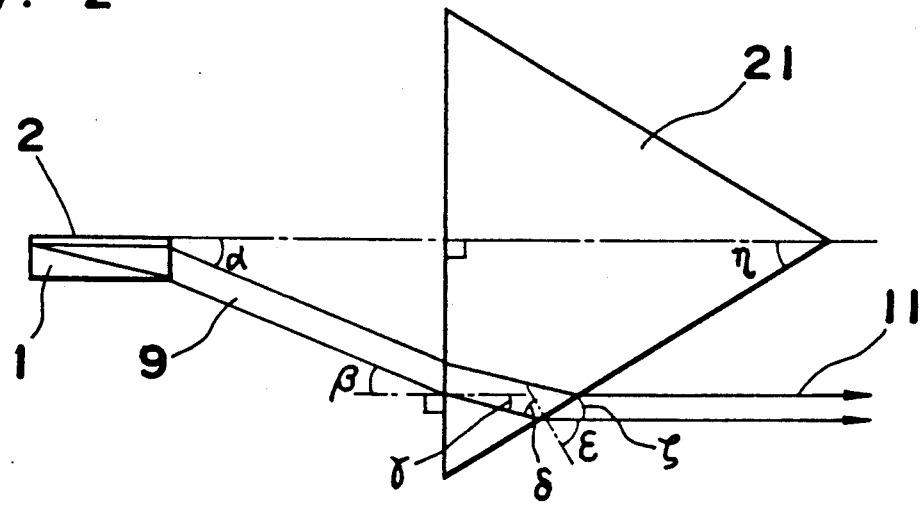
FIG. 2 is an explanatory diagram illustrating the operating principle of the present invention.
Figure 3:
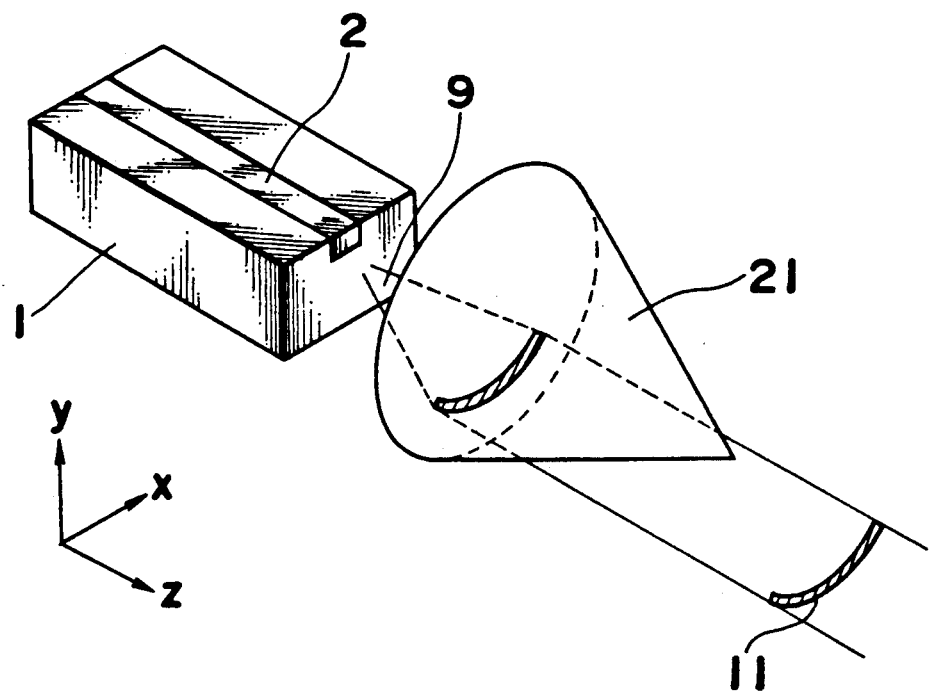
FIG. 3 is a perspective view showing the diffused rays being transmitted as parallel rays by the light wavelength converting apparatus of the present invention.

FIG. 2 is a sectional view of the invention illustrating the Cherenkov radiation light being transmitted as parallel rays with the use of the conical lens, while FIG. 3 is a perspective view thereof. In FIG. 2 and FIG. 3, reference numeral 9 designates Cherenkov radiation light, and reference numeral 21 designates a conical lens, with the central axis of the optical waveguide passage 2 being aligned with the rotary optical object axis of the conical lens 21. In a light focusing means having the structure described hereinabove, the operation is as follows. In FIG. 2, an angle $\alpha$ is a Cherenkov radiation angle, which is a constant determined by the characteristics of the mechanism radiating the Cherenkov radiation light. An angle $\beta$ is an incident angle of the Cherenkov radiation light at which the light intersects the bottom face of the conical lens 21. An angle $\gamma$ is a transmitted angle. An angle $\delta$ is an incident angle at which the light intersects the side face of the conical lens 21. An angle $\epsilon$ is a transmitted angle associated with angle $\delta$. An angle $\zeta$ is the angle defined between the side face and the Cherenkov radiation light refracted by the side face of the conical lens 21. The angle $\zeta$ is half the vertex angle of the conical lens 21.

Here, the following formulas are provided from FIG. 2, simple geometry theorem and the refraction rule.

$$\alpha = \beta, \sin\beta = n \sin\gamma, n \sin\delta = \sin \epsilon \epsilon + \zeta = \pi/2$$

wherein the refractive index of air through which the Cherenkov radiation light 7 is transmitted is 1, the refractive index of the conical lens 21 is n.

$$\epsilon + \delta = \epsilon, \eta = \zeta$$

The angles $\alpha$ and $\eta$ in these formulas wherein the SH light rays 11 transmitted from the conical lens 21 are parallel to the rotation axis of the conical lens 21, i.e., under conditional formulas, are established as follows.

$$\eta = \tan^{-1}\left(\frac{n \cos\left\{\sin^{-1}\left(\frac{\sin \alpha}{n}\right)\right\} - 1}{\sin \alpha}\right) \quad (1)$$

Accordingly, if the n and $\eta$ which satisfy the relationship of formula (1) exist when the Cherenkov cone has a vertex angle $2\alpha$, all of the rays of the Cherenkov radiation light 9 in FIG. 2 become parallel to the rotation axis of the conical lens 21. As a result, even in the stereo construction of FIG. 3, wherein the figures in FIG. 2 may be obtained through the rotation around the rotation axis, all of the rays of Cherenkov radiation light 9 are parallel to the rotation axis, i.e. are parallel rays. In experiments for determining n and the $\eta$, when laser light having a wavelength of 860 mm is incident on the waveguide formed on a substratum surface of lithium niobate (LiNbO3), the radiation angle $\alpha$ is 53°. At this time, when, for example, glass material LaK14 (n=1.716 at wavelength=430 nm) is used, an angle $\eta = 33°$ is obtained. Because the parallel rays obtained here are ring-shaped, it is necessary only to align the optical axis of the conical lens 21 of FIG. 3 with the spherical concave and convex lens pair set in phomofocal position for enlarging the light beam diameter as described in the conventional apparatus.

The rotary object axis of the conical lens defining the vertex angle of the Cherenkov cone and the vertical angle determined by the refractive rate of the nitric material are provided in conformance with the rotary object axis of the Cherenkov cone so that the Cherenkov radiation rays of light may be transmitted as parallel rays.

Figure 4A:
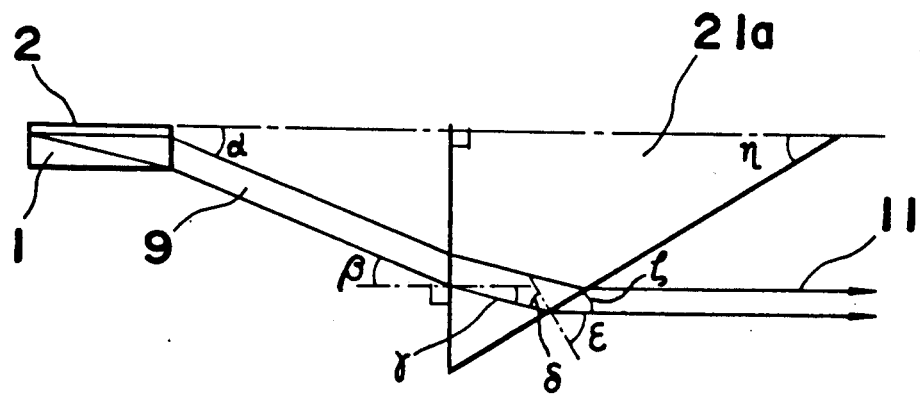
FIGS. 4(a), (b) and (c) are explanatory diagrams illustrating the operating principle of the present invention.
Figure 4B:
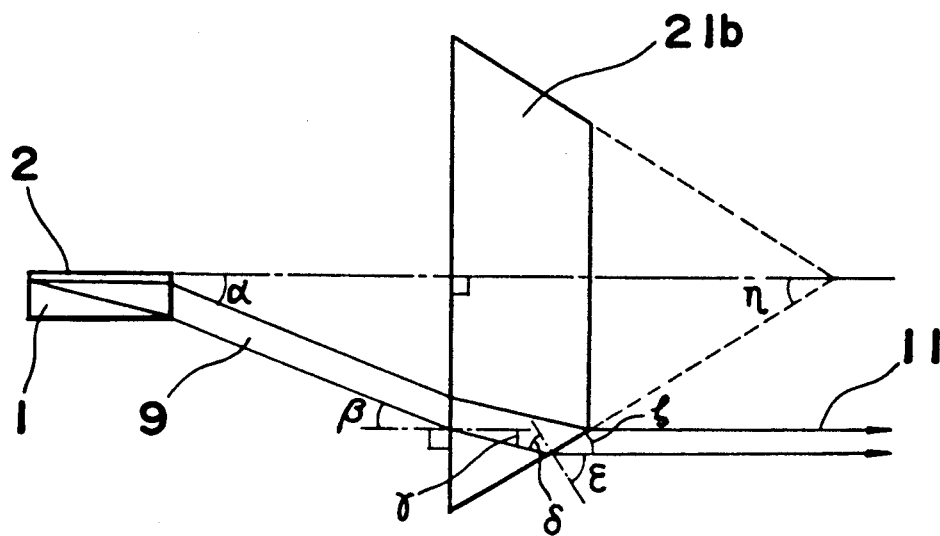
Figure 4C:
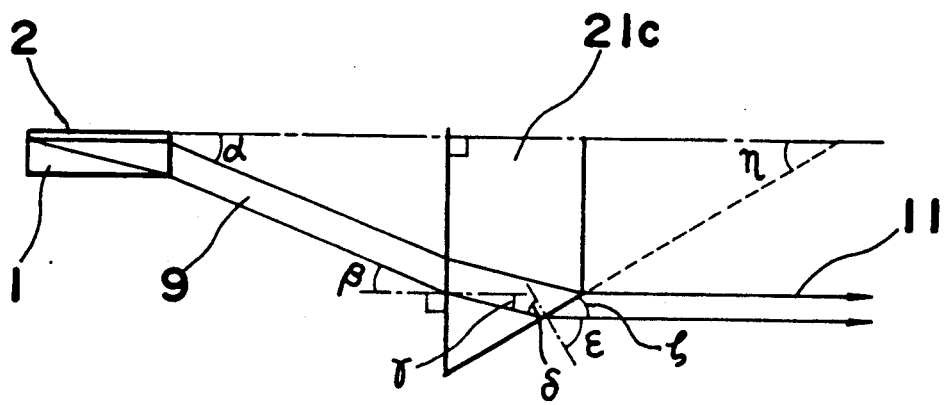

It is to be noted that in the above-described structure, the rays become parallel in accordance with the principle described in conjunction with the lens as shown in FIG. 1 as with the conical lens. Also, instead of the conical lens, portions of a conical lens such as those shown in FIG. 4(a) through (c) may be used.

Furthermore, not only the conical lens, but also the rotation object lens having the slant portion thereof or one portion of the rotary object lens may be used.

As described hereinabove, it is confirmed that the Cherenkov radiation rays of light may be transmitted as parallel rays by the structure shown in FIG. 1.

Figure 5:
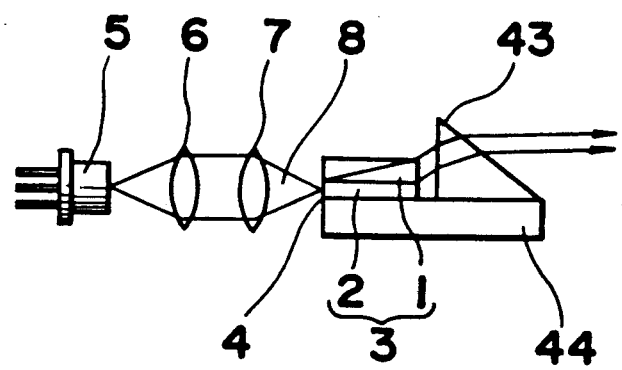
FIG. 5 is a schematic of an optical wavelength converting apparatus according to a second embodiment of the present invention.

The second embodiment will be described hereinafter with reference to FIG. 5. The same reference numerals are used with respect to the components common to the embodiment of FIG. 1 and the description thereof is thus omitted. The semi-conical lens 43 has a planar face extending cross-sectionally through the conical central axis. A base plate 44 is provided on which the optical wavelength converting element 3 and the semi-conical lens 43 are secured. The base plate may be optional in quality such as glass, ceramic, metal or the like, as long as the surface thereof can be flat.

The optical waveguide face of the SHG element 4 is bonded onto the base plate 44, with the optical waveguide passage being aligned with the optical axis of the semi-conical lens 43. As shown in FIG. 4, even half of a conical lens is capable of sufficiently achieving the desired function so that SH rays 31 which are the parallel may be obtained.

In the second embodiment, the semi-conical lens 43, corresponding to a conical lens cut by an orthogonal plane passing through the optical axis, can be more easily aligned with the optical waveguide of the SHG element 3. Furthermore, because the SHG element 3 and the conical lens 43 are integrally secured, the misalignment of the optical axes due to temperature, vibration and so on is reduced.

Figure 6:
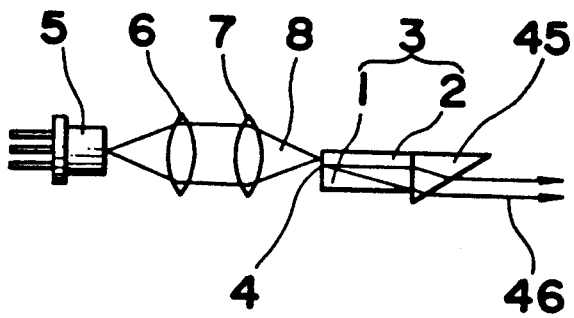
FIG. 6 is a schematic of an optical wavelength converting apparatus according to a third embodiment of the present invention.

FIG. 6 is a schematic of the third embodiment. In FIG. 6, the same reference characters are used with respect to the elements common to the embodiment of FIG. 1 and the description thereof is omitted. In the embodiment, the semi-conical lens 45 is secured with optical transparent bonding agent to the output end of the SHG element 4, so that the parallel rays 46 may be obtained. Thus, this optical wavelength converting apparatus may be comparatively smaller. Furthermore, the misalignment of the optical axes due to temperature, vibration and so on is reduced.

Figure 7:
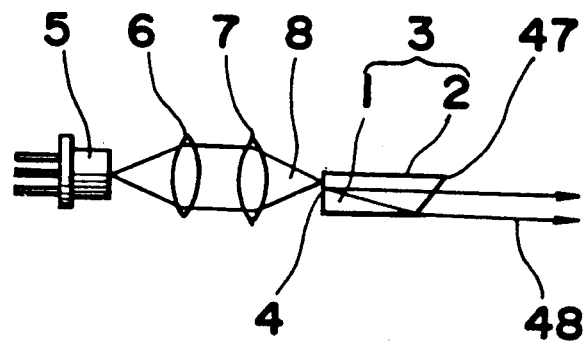
FIG. 7 is a schematic of an optical wavelength converting apparatus according to a fourth embodiment of the present invention.

FIG. 7 is a schematic of the fourth embodiment. In the drawing, the same characters are used with respect to the components common to the embodiment of FIG. 1 and the description thereof is omitted. In the present embodiment, the tip end 47 of the SHG element 4 is semi-conical so as to comprise an integrated conical lens wherein the rays 7 may be transmitted as parallel rays 48. The Cherenkov cone established by the waveguide 2 facilitates parallel rays when the following relationship is satisfied:

$$\theta = \tan^{-1}\left(\frac{1 - n\cos\alpha}{n\sin\alpha}\right)$$

wherein the index of refraction of the optical crystal is n, 2α is the vertex angle of the Cherenkov cone, and 2Θ is the vertex angle of the tip end 47 although a detailed calculation is omitted, in accordance with the same principles described above.

As described hereinabove, the tip end or optical light flux shaping portion 47 may be cut from the optical crystal base plate 1 so that the positional alignment of the rotary object axis of the rotary object lens with the optical axis of the optical waveguide is unnecessary, thus resulting in a reduction in the number of the parts.

Figure 8:
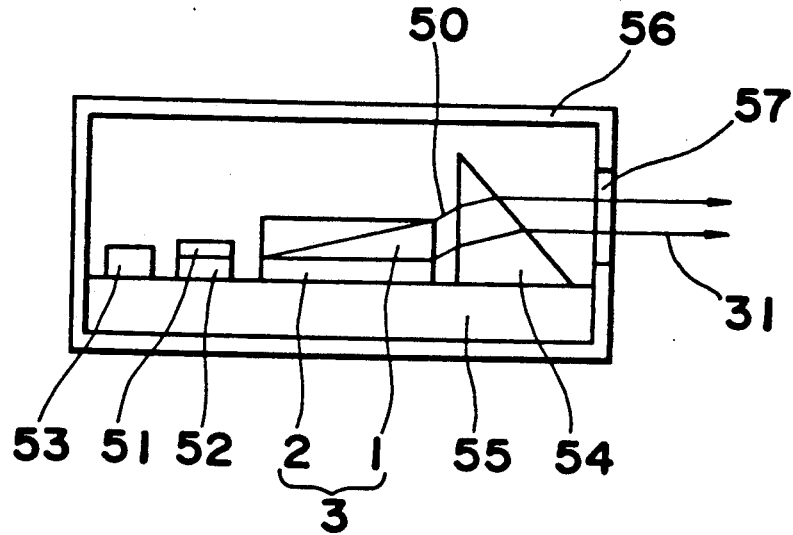
FIG. 8 is a schematic of an optical wavelength converting apparatus according to a fifth embodiment of the present invention.

FIG. 8 is a schematic of the fifth embodiment of the present invention.

In the present embodiment, all of the elements are disposed on the base plate 55 so as to constitute a module.

In the drawings, a pin photodiode 53 monitors the laser light rays which have been transmitted from the semiconductor laser tip 51. Reference character 52 designates an active layer. A semi-conical lens 54 has a planar surface parallel to the central axis. A base plate 55 is provided on which the conductor laser tip 51, the pin photodiode 53, the SHG element 3, and the semi-conical laser 54 are secured. Also, a casing 56 contains N2 gas. A transmission window 57 is provided through which the SH rays 50 may pass as parallel rays.

In the present embodiment, the laser light transmitted from the semiconductor laser tip 51 becomes incident directly on the SHG element 3 without passing through the lens, so that the loss of the light may be reduced.

Also, because the elements are secured integrally on the base plate 55, they are more resistant to disturbances such as vibrations, temperature variations or the like.

Although the cylindrical portion 41a is provided on the cylindrical lens 41b in the first embodiment, the cylindrical portion may be omitted and instead other optical axis alignment means may be used.

The portions, such as those defining the vertex angle of the conical lens 41b or the like, through which the rays do not actually pass may be cut away as shown in FIG. 4.

Also, in the second embodiment, although the semi-conical lens 43 has a planar face passing through the central axis, the planar face may be spaced but parallel to the central axis.

Furthermore, in the first through the fourth embodiments, although the collimator lens and the focusing lens are used to direct the semiconductor laser light so as to become incident on the optical waveguide passage, it is possible to effect the direction of the light onto the waveguide passage by one lens as shown conventionally, instead of two lenses. Also, although the object described has been to obtain parallel rays, it is possible to focus or diffuse the Cherenkov radiation rays of light by varying the angle formed by the rotation object face through which the Cherenkov radiation rays of light pass. Also, in the fourth embodiment, although the waveguide passage 2 is to be formed on the surface of the optical crystal 1, it may be provided within the interior thereof.

In this case, the optical light flux shaping portion 47 is conical instead of semi-conical.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An optical wavelength converting apparatus comprising:
   a light source;
   an optical wavelength converting element comprising an optical waveguide capable of changing the wavelength of light of the type radiated by said light source that is incident at one side thereof, said optical waveguide having a central axis and transmitting light incident at one said side thereof at an angle other than 0° with respect to said central axis;
   directing means operatively disposed in the apparatus between said light source and said optical waveguide for directing light radiated by said light source onto said one side of the optical waveguide;
   a rotation lens defining at least a portion of a conical surface symmetrical with respect to an optical object axis of the lens,
   said rotation lens disposed adjacent another side of said optical waveguide opposite that to which light radiated by said light source is directed by said directing means, and said optical wavelength converting element comprising said optical waveguide transmitting light, radiated by said light source and incident at said one side of said optical waveguide, to said at least a portion of a conical surface as divergent rays,
   divergent rays impinging said at least a portion of a conical surface thereof being transmitted by said rotation lens as parallel rays.

2. An apparatus as claimed in claim 1, wherein said optical wavelength converting element comprises a substrate of lithium niobate on which said optical waveguide is disposed, said optical waveguide transmitting light incident at said one side thereof through an emission side of said substrate.

3. An apparatus as claimed in claim 2, and further comprising a base plate to which said optical wavelength converting element and said rotation lens are secured.

4. An apparatus as claimed in claim 2, wherein said rotation lens is disposed against the emission side of said substrate.

5. An apparatus as claimed in claim 1, wherein said rotational lens is a conical lens.

6. An apparatus as claimed in claim 1, wherein said rotation lens is disposed in the apparatus with said optical object axis thereof aligned with the central axis of said optical waveguide.

7. An apparatus as claimed in claim 6, and satisfying the equation $$\eta = \tan^{-1}\left(\frac{n\cos\left\{\sin^{-1}\left(\frac{\sin\alpha}{n}\right)\right\} - 1}{\sin\alpha}\right)$$

wherein η is the angle defined between said optical object axis and said at least a conical surface of said rotation lens, $\alpha$ is an angle at which said optical waveguide transmits light incident at said one side thereof with respect to said central axis, and n is the refractive index of said rotation lens.

8. An apparatus as claimed in claim 7, wherein said rotation lens is conical.

9. An apparatus as claimed in claim 1, wherein said rotation lens is disposed in the apparatus with said optical object axis thereof aligned with the central axis of said optical waveguide.

10. An optical wavelength converting apparatus comprising:
a light source comprising a laser;
an optical wavelength converting element comprising an optical waveguide capable of changing the wavelength of laser light of the type emitted by said laser that is incident at one side thereof, and a substrate of lithium niotrate on which said optical waveguide is disposed, said optical waveguide having a central axis and transmitting light incident at said one side thereof through an emission side of said substrate; and
directing means operatively disposed in the apparatus between said light source and said optical waveguide for directing light radiated by said light source onto said one side of the optical waveguide;
a rotation lens defining at least a portion of a conical surface symmetrical with respect to an optical object axis of the lens,
said rotation lens disposed adjacent another side of said optical waveguide opposite that to which light radiated by said light source is directed by said directing means, with said optical object axis aligned with the central axis of said optical waveguide, and said optical wavelength converting element comprising said optical waveguide transmitting light, radiated by said light source and incident at said one side of the optical waveguide, to said at least a portion of a conical surface as divergent rays,
divergent rays impinging said at least a portion of a conical surface being transmitted by said rotation lens as parallel rays.

* * * * *